(12) United States Patent
Fischer

(10) Patent No.: US 11,385,151 B2
(45) Date of Patent: Jul. 12, 2022

(54) MEASURING DEVICE AND DETECTION OF MEASUREMENT SIGNALS DURING A PENETRATING MOVEMENT OF PENETRATING MEMBER

(71) Applicant: Helmut Fischer GmbH Institut für Elektronik und Messtechnik, Sindelfingen (DE)

(72) Inventor: Helmut Fischer, Oberägeri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 522 days.

(21) Appl. No.: 16/070,617

(22) PCT Filed: Jan. 9, 2017

(86) PCT No.: PCT/EP2017/050306
§ 371 (c)(1),
(2) Date: Jul. 17, 2018

(87) PCT Pub. No.: WO2017/125270
PCT Pub. Date: Jul. 27, 2017

(65) Prior Publication Data
US 2021/0208041 A1     Jul. 8, 2021

(30) Foreign Application Priority Data

Jan. 18, 2016    (DE) .......................... 102016100708.0

(51) Int. Cl.
*G01N 3/46*     (2006.01)
(52) U.S. Cl.
CPC ....... *G01N 3/46* (2013.01); *G01N 2203/0042* (2013.01); *G01N 2203/0051* (2013.01);
(Continued)

(58) Field of Classification Search
CPC ............. G01N 3/46; G01N 2203/0042; G01N 2203/0051; G01N 2203/0078; G01N 2203/0617; G01N 3/42; G01N 2203/0096
See application file for complete search history.

(56) References Cited

U.S. PATENT DOCUMENTS 2,620,655 A    12/1952   Priest
2,803,130 A *   8/1957   Bernhardt ................ G01N 3/42
                                                            73/81
(Continued)

FOREIGN PATENT DOCUMENTS

DE    3128537    *   2/1983
DE    4220510    *  12/1993
(Continued)

OTHER PUBLICATIONS

International Search Report for corresponding Patent Application No. PCT/EP2017/050306 dated Apr. 4, 2017. (Year: 2017).*
(Continued)

*Primary Examiner* — Judy Nguyen
*Assistant Examiner* — Martin Walter Braunlich
(74) *Attorney, Agent, or Firm* — Renner, Otto, Boisselle & Sklar, LLP

(57) ABSTRACT

A measuring device for detection pf measurement signals during a penetrating movement of a penetrating member into a surface of a test object or during a sensing movement of the penetrating member on the surface of the test object. The measuring device includes a housing which accommodates a force generating device and on which a holding element is arranged remote from the force generating device, which holding element is movable relative to the housing at least in one direction along a longitudinal axis of the housing and which accommodates the penetrating member. The measuring device also includes at least one first measuring element for measuring the penetration depth of the penetrating
(Continued)

Figure 1:
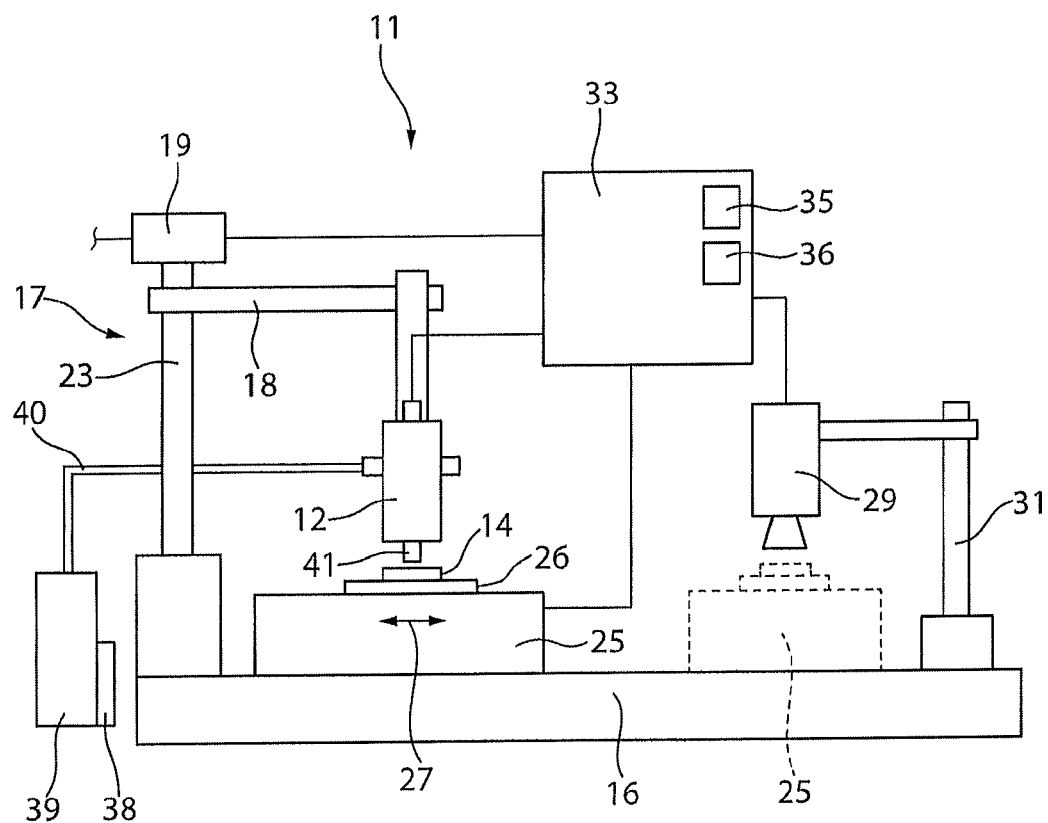

member into the surface of the test object or a traversing movement of the penetrating member along the longitudinal axis relative to the housing during a sensing movement on the surface of the test object, wherein a transmission element is provided which extends between the force generating device and the penetrating member.

11 Claims, 4 Drawing Sheets

(52) U.S. Cl.
CPC ............ *G01N 2203/0078* (2013.01); *G01N 2203/0617* (2013.01)

(56) References Cited

U.S. PATENT DOCUMENTS

| | | | |
|---|---|---|---|
| 4,976,152 A * | 12/1990 | McKinley | G01N 3/20 73/852 |
| 5,067,346 A | 11/1991 | Field | |
| 6,945,097 B2 * | 9/2005 | Jardret | G01N 3/46 73/799 |
| 7,685,869 B2 * | 3/2010 | Bonilla | G01N 3/317 73/105 |
| 8,655,602 B2 * | 2/2014 | Sawa | G01N 3/42 702/42 |
| 2004/0011119 A1 | 1/2004 | Jardret | |
| 2009/0158826 A1 | 6/2009 | Leroux | |
| 2014/0150562 A1 | 6/2014 | Warren | |

FOREIGN PATENT DOCUMENTS

| | | | |
|---|---|---|---|
| DE | 69917780 | * | 6/2005 |
| JP | 2006-250557 | | 9/2006 |

OTHER PUBLICATIONS

International Search Report for corresponding Patent Application No. PCT/EP2017/050306 dated Apr. 4, 2017.

* cited by examiner

MEASURING DEVICE AND DETECTION OF MEASUREMENT SIGNALS DURING A PENETRATING MOVEMENT OF PENETRATING MEMBER

The invention relates to a measuring device for detecting measurement signals during a penetration movement of a penetration body into a surface of a test body, in particular for identifying the hardness or the scratch-resistance of the surface of the test body.

A measuring device for measuring the scratch-resistance of a surface of a film or a coating of a test body is known from DE 699 17 780 C2. This measuring device comprises a first profile-shaped body to which a piezoelectric drive is fastened. This engages a plate which is connected to the open C-shaped ends of the C-profile-shaped body via spring elements. A second C-profile-shaped holding body is in turn arranged on this plate, which moveably accommodates, once again via springs, a holding plate relative to the open ends of the C-profile-shaped body. A penetration body is provided on the lower end of the holding body, said penetration body penetrating into the surface of the test body. Such a measuring device is complicated and costly in design. Furthermore, high masses are moved between the drive and the penetration tip.

A device for measuring the size and shape of surface irregularities is known from U.S. Pat. No. 2,620,665 A. The measuring device comprises a housing to which a pair of leaf springs is fastened. A transmission pin is provided on each free end of the leaf spring, said transmission pin being moveable up and down by the leaf springs. A scanning tip is provided on a free end of the transmission pin. A lightweight coil is provided on the opposite end of the transmission pin, which detects a change in position during scanning of a surface roughness.

The object of the invention is to create a measuring device in which an arrangement for actuating the penetration body having a low mass is formed between the drive and the penetration body.

This object is solved by a measuring device in which an extending transmission element is provided between the force generating apparatus and the penetration body. Such a transmission element is formed to be low in mass and can transmit the pressure movement generated by the force generating apparatus directly to the penetration body.

This transmission element extending from the penetration body to the force generating device and having a low mass can, for example, be used in a measuring device for detecting a penetration movement of a penetration body into a surface of a test body, such as, for example, a hardness measuring device, or in a measuring device for identifying the scratch-resistance of the surface of the test body. Alternatively, this measuring device can also be provided for a scanning movement of the penetration body on the surface of the test body, in order, for example, to carry out a roughness measurement or detect a position recognition of the surface of the test body or carry out a so-called pre-scan and/or post-scan during the scratch-resistance identification of the surface of a test body.

Furthermore, a first sensor element of a first measuring device is provided on a housing portion of the housing, which is arranged in a non-touching manner with respect to a second sensor element of the first measuring device, said second sensor element being fastened to the transmission element. This first measuring device detects, for example, a penetration movement of the penetration body and is preferably formed as a distance sensor. Here, the sensor element which has the lower mass is fastened to the transmission pin in order to hold down the entire mass of the elements which are moved.

The transmission element is preferably formed to be rod- or pin-shaped. A pressure-resistant transmission element is thus created, which transmits the penetration movement caused by the force generating apparatus directly to the penetration body. This rod- or pin-shaped transmission element can be formed both in a solid cross-section and a hollow body. Likewise, the transmission pin can have, for example, a U-profile or an H-profile or similar in order to form a bending-resistant or buckle-resistant transmission pin.

Furthermore, the transmission pin preferably engages the force generating apparatus by means of a connection element. A simple and fast linking of the transmission pin can thus be provided.

Furthermore, a connection element is preferably provided on the holding element, said holding element accommodating the penetration body and being fastened to the housing in order to fasten the transmission pin to the holding element or couple it thereto. The transmission pin can thus be integrated between the force generating apparatus and the holding element in a simple manner and can also be provided exchangeably. This thus additionally causes the transmission element to extend continuously between the force transmission apparatus and the holding element.

The connection element on the force transmission apparatus and/or on the holding element is preferably formed by an accommodating bore in which an end of the transmission element, in particular transmission pin, is respectively accommodated. The transmission element is fixed on or in the connection element, preferably with a fastening element. This enables a simple and fast mounting of the transmission pin.

Furthermore, a first sensor element of a further measuring device can preferably be provided on a housing portion of the housing, said sensor element being assigned to a second sensor element of the second measuring apparatus, said second sensor element being in turn fastened to the transmission element. For example, a deflection or displacement of the transmission pin in a plane perpendicular to the longitudinal axis of the transmission element can be detected by this second measuring apparatus.

The first and second measuring apparatus preferably operate in a contactless manner, in particular in a non-touching manner, such that the travelling movement or lifting movement for generating the penetration movement of the penetration body is free from any friction.

Furthermore, the holding element is preferably provided on a lower peripheral region of the housing portion of the housing of the measuring device and at a distance from the force generating apparatus, said holding element accommodating the penetration body. The penetration body can thus be directly accommodated on the penetration site and guided in a secured manner.

The holding element is preferably formed as a pressure membrane and has a freedom of movement in at least one degree of freedom, in particular in the degree of freedom in the movement direction of the force generating apparatus. This measuring device is thus suitable not only for carrying out a hardness measurement, but also for identifying a scratch-resistance of a surface of the test body.

An alternative embodiment of the holding element provides that this holding element points at least in the direction of the displacement in its extension plane and is formed to be rigid in a direction perpendicular thereto and soft in the second direction. A further parameter besides the depth of penetration can thus be detected, in particular when a scratch-resistance measurement is being carried out, namely the lateral displacement, in order to enable an improved evaluation.

The holding element is preferably formed from copper beryllium. This material is especially suitable because it is without virtually hysteresis. A direct and loss-free control of the penetration body is thus possible.

Furthermore, the first measuring device preferably operates according to the eddy current principle. This is a proven measuring apparatus free from after-effects which also enables a compact structure. For example, a ferrite plate or a ferrite ring can be fastened, preferably releasably, in particular by a screw connection, to the transmission pin as a moveable second sensor element, and a pot coil can be fastened to a housing as a first fixed sensor element.

This applies analogously for the second or further measuring device which likewise operates according to the eddy current principle. For example, this second measuring device can detect a displacement of the penetration body in the X direction—i.e. perpendicular to the penetration movement of the penetration body in the Z direction. A displacement of the penetration body or the transmission pin along the travelling direction of the sample body during a measurement of the scratch resistance of the sample body can thus be detected. Alternatively, two sensor elements on the housing can also be assigned to a sensor element on the transmission element which are offset from each other by 180°. Firstly, a displacement of the transmission pin can be detected along the travelling path of the sample body—i.e. in the X direction—and secondly in the Y direction, can be detected.

Furthermore, the penetration body is preferably provided exchangeably on the transmission pin. There can thus not only be a fast and simple adaptation to different measuring tasks, but a quick exchange can also take place in the event of damage to the penetration body. The same preferably applies for the penetration tip arranged exchangeably on the penetration body.

Furthermore, the force transmission apparatus is formed as a piezoelectric drive, a pneumatic drive, a hydraulic drive or an electromagnetic drive. All of these drives enable a penetration movement of the penetration body or a lifting movement to be generated which can be transmitted to the transmission element.

Figure 2:
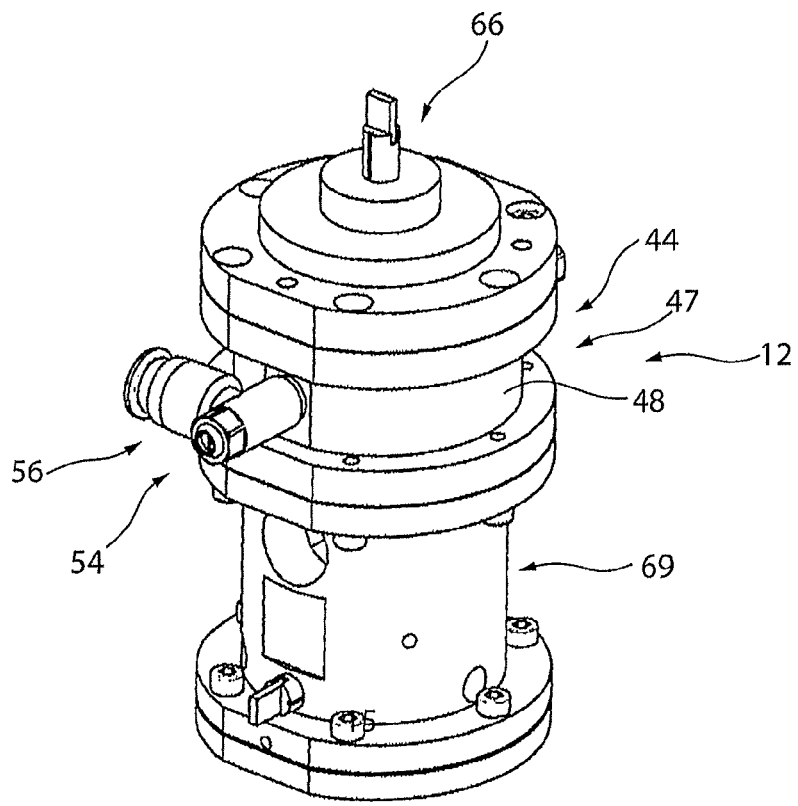
Figure 3:
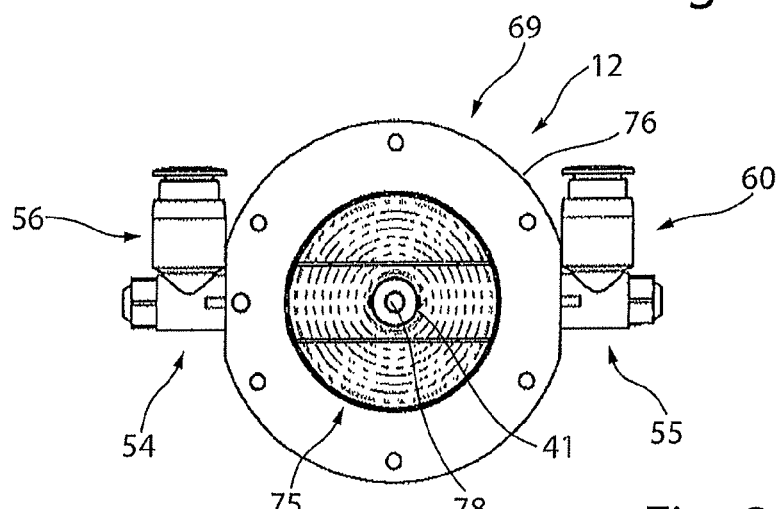

The invention as well as further advantageous embodiments and developments of the same are depicted and explained in more detail in the following using the examples depicted in the drawings. The features to be taken from the description and the drawings can be applied individually or in any combination according to the invention. Here are shown:

FIG. 1 a schematic view of a measuring arrangement according to the invention,

FIG. 2 a schematically enlarged view of an inventive measuring device of the measuring arrangement according to FIG. 1, FIG. 3 a schematic view from below of the measuring device according to FIG. 2, FIG. 4 a schematic sectional view of the measuring device according to FIG. 2 and FIG. 5 a schematic sectional view of an alternative measuring device to FIG. 2.

A measuring arrangement 11 is schematically depicted in FIG. 1. Such a measuring arrangement 11 can be provided for testing mechanical and/or physical properties of surfaces on test bodies 14, such as, for example, films, layers and/or coatings on objects. For example, the measuring arrangement 11 can be used as a hardness measuring apparatus in which a hardness measurement is carried out by penetration by means of a penetration body 41 of a measuring device 12. Furthermore, this measuring arrangement 11 can be provided with the measuring device 12 for identifying a scratch-resistance of a film, a layer or coating on objects. Here, for example, CVD or PVD coatings can be checked with respect to their scratch-resistance. Likewise, further micro-scratches or other further deformation information can be detected and analysed from the surface. This measuring arrangement 11 likewise enables a roughness measurement of a surface of the test body 14, especially with the measuring device 12, without accompanying damage to the surface of the test body 14. In this case, the penetration body 41 is placed on the surface of the test body 14 and transported along the surface for scanning the roughness of the surface of the test body.

The measuring arrangement 11 comprises a mutual base body 16. This can preferably be formed from granite. A tripod 17 is provided on the base body 16, said tripod accommodating the measuring device 12 on a boom 18. This tripod 12 comprises a drive motor by means of which the measuring device 12 is transportable from an initial position 21 depicted in FIG. 1 into a test position 22 in which the penetration body 41 rests on a test body 14. For example, the drive motor 19 can drive the boom 18 for an up and down movement along a guide post 23 of the tripod 12.

A measurement table 25 is furthermore provided on the base body 16. This measurement table 25 has a measurement table receptacle 26 which is transportably driven, at least in the X direction, according to arrow 27. The test body 14 is placed on the measuring table receptacle 26 and fastened thereto.

The measuring arrangement 11 can furthermore comprise an optical detection apparatus 29 which can likewise be arranged on the tripod 17 or, advantageously, separately therefrom, on a further tripod 31. This optical detection apparatus 29 can be positioned adjacent to the measuring device 12. Here, the measurement table 25 or the measurement table receptacle 26 is designed to be transportable in such a manner that the test body 14 can be transported to the optical detection apparatus 29 after the introduction of a penetration point or a scratch into the surface of the test body 14, such that the penetration point or the scratch which have been introduced into the surface of the test body 14 can be optically detected. Alternatively, a travelling movement of the measurement device 12 and the optical detection apparatus 29 relative to the measurement table 25 can be provided.

The measuring arrangement 11 furthermore comprises a schematically depicted controller 33 which comprises a computing apparatus which is not depicted in more detail, a display device 35 and an input device 36. The controller 33 is at least connected to the tripod 17, the measuring device 12 and the measurement table 25 by signal lines. Preferably, the optical detection apparatus 29 and optionally the tripod 31 accommodating the optical detection apparatus 29 are also joined thereto.

Furthermore, the measuring arrangement 11 has at least one pump 38 for controlling the measuring device 12, by which a pressure medium of the measuring device 12 is delivered in order to control a penetration movement of the penetration body 41 of the measuring device 12. This pump 38 is connected to the controller 33 with a signal line. Advantageously, the pump 33 can deliver the pressure medium to a storage container 39, out of which the pressure medium is delivered to the measuring device 12 via a delivery line 40. Both the pump 38 and the storage container 39 are not arranged on the mutual base body 16.

In FIG. 2, a perspective view of the measuring device 12 according to the invention is depicted. FIG. 3 shows a view from below. In FIG. 4, a schematic sectional view of the measuring device 12 according to FIG. 2 is depicted, which more detailed reference is made, in particular, to the depiction of the structure.

This measuring device 12 has a force generating apparatus 44 by means of which a travelling movement, in particular penetration movement, of the penetration body 41 onto the surface of the test body 14 is controlled. This force generating apparatus 44 comprises a pressure chamber 46 which is integrated in a housing 47. This housing 47 has a cylindrical housing wall 48 to which a first pressure surface 51 and a second pressure surface 52 is assigned. These two pressure surface 51, 52 are advantageously fixed to the housing wall 48 by a releasable connection, in particular a clamp connection or screw connection. The pressure chamber 46 is formed by the housing wall 48 and the first and second pressure surfaces 51, 52. Alternatively, a closed pressure chamber with terminals arranged thereon can be used. An inlet opening 54 and an outlet opening 55 are provided on the housing wall 48, such that a pressure medium can be delivered and discharged.

An inlet control valve 56 is preferably provided in the delivery line 40 leading to the inlet opening 54. Alternatively, the inlet valve 56 is directly attached to the inlet opening. An outlet control valve 60 is arranged in a further delivery line 58 on the outlet side for outflow of the pressure medium from the pressure chamber 46. This can also be directly attached to the outlet opening 55.

The first and second pressure surfaces 51, 52 are preferably formed as a pressure membrane, in particular undulated pressure motors having preferably circular waves, which have one degree of freedom only in one movement direction, said degree of freedom being orientated in the Z direction and being on a longitudinal central axis 61 of the measuring device 12. A rotation of the pressure surfaces 51, 52 around the Z axis is prevented by the clamping of the first and second pressure surfaces 51, 52.

A pressure stamp is fixedly arranged on each of the first and second pressure surfaces 51, 52. For example, a sensor 66 assigned to the second pressure surface 52 can be fastened via a connection element 64. The sensor 66 is formed in particular as a pressure sensor which detects the pressure located in the pressure chamber 46 depending on the movement of the second pressure surface 52, and conveys it to the controller 33.

A transmission element 68 is provided between the first pressure surface 51 and the penetration body 41, which extends through a housing portion 69 which adjoins the housing wall 47. This housing portion 69 is formed to be cylindrical, such that a first measuring device 71 for detecting a travelling movement in the Z direction of the penetration body 41 is provided therein. Furthermore, a further measuring device 73 is preferably arranged in the housing portion 69, which detects at least one displacement in the X direction of the penetration body 41 during a penetration into the surface of the test body 25. This can preferably also take place during a simultaneous travelling movement of the test body 14 in the X direction. Furthermore, the at least one further measuring device 73 can also detect a displacement of the penetration body 41 in the Y direction.

A holding element 75 is also provided on the lower housing portion 69, which accommodates the penetration body 41 and extends up to an outer edge region 76 on the housing portion 69. This holding element 75 can in turn be fastened to a releasable connection on the housing portion 69. The holding element 75 is formed as a pressure membrane which has one degree of freedom in at least one movement direction. This at least one degree of freedom is in the Z axis or in the longitudinal central axis 61 of the measuring device 12. The holding element 75 is preferably provided with two longitudinal slots, as depicted in FIG. 3. The holding element 75 thus becomes soft in a direction parallel to the longitudinal slots, which correspond to the X axis, and rigid in a Y axis. Because the holding element 75 is formed as a pressure medium, this holding element has a very low flexibility and is preferably not formed to be pressure-resistant in the X and Y direction.

The penetration body 41 is fastened exchangeably on the lower end of the transmission element 68. The penetration body 41 has a penetration tip 78 which can be releasably fastened on the penetration body 41.

The housing portion 69 has a shoulder 81 which forms a through bore 82 through which the transmission element 68 extends. A first sensor element 84 of the first measurement device 71 is fixedly arranged on the shoulder 81 and a second sensor element 85 of the first measuring device 71 is arranged adjacently thereto on the transmission element 68. For example, the first and second sensor elements 84, 85 of the first measurement device 71 are formed as a distance sensor, wherein the first sensor element 84 of the first measurement device 71 comprises a pot magnet having a coil and the second sensor element 85 of the first measurement device 71 is a disc made of a ferritic material which can be fastened to the transmission pin 68. This second sensor element 85 of the first measurement device 71 is preferably releasable on the transmission element 68 and adjustable in its distance from the first sensor element 84 of the first measurement device 71, such that an aligning of the penetration body 41 in an initial position is possible. The measuring device 71 operates according to the eddy current principle.

The further measuring device 73 comprises a first sensor element 88 of the further measuring device 73 arranged on a holder 87 which is provided to be fixed in place or housing-fixed, as well as a second sensor element 89 of the further measuring device 73 which in turn engages the transmission pin 68. According to a first embodiment, this second sensor element 89 of the further measuring device 73 can be formed as a ferrite ring, opposite to which there is a coil that forms the first sensor element 88 of the further measuring device 73. A deflection of the penetration body 41 in the X direction can thus be detected, said deflection being generated during the introduction of the penetration point or the scratch 91 through the surface onto the penetration body 41 and transmitted to the transmission pin 68. In addition, a third sensor element 90 of the further measuring device 73 can also be provided in order to detect a deflection in the X direction, such that an improved statement on the deviation in the X direction can be identified by a comparison of the detected values to the first and third sensor element 88, 90 of the further measuring device 73. Alternatively, the third sensor element 90 of the further measuring device 73 can also be arranged offset by 90° relative to the first sensor element 88 of the further measuring device 73, such that the first sensor element 88 of the further measuring device 73 detects a deflection in the X direction and the second sensor element 89 of the further measuring device 73 detects a deflection in the Y direction.

Figure 4:
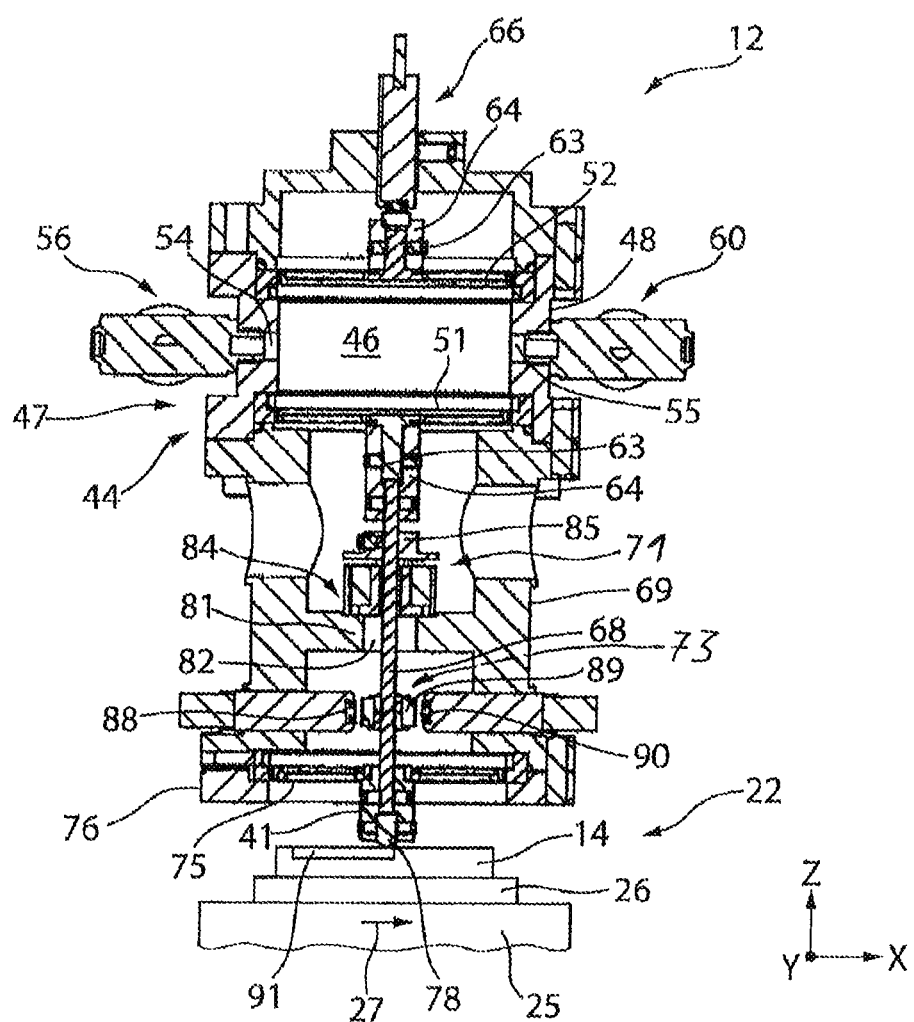
Figure 5:
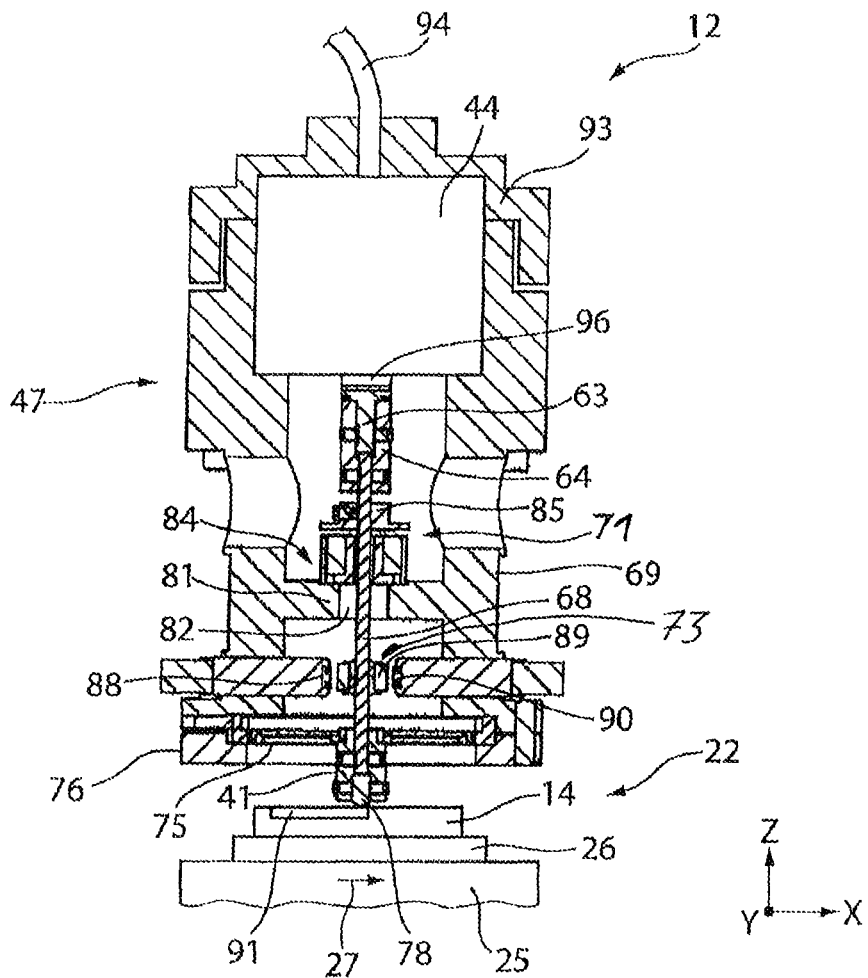

An alternative embodiment of the measuring device 11 to FIG. 4 is depicted In FIG. 5. This embodiment deviates from the embodiment according to FIG. 4 to the extent that the force generating apparatus 44 is formed, for example, by a piezoelectric drive. In this embodiment, the housing 47 is thus simplified. This piezoelectric drive 44 is inserted into the housing portion 69 and fixed by means of a closure 93. An electrical connecting line 94 is guided out of the closure 93. This piezoelectric drive has an actuating member 96, which is formed, for example, as a pressure plate, a stamp or similar. The connection element 64 is preferably arranged on or fastened to this actuating member 96, such that there is a connecting point or coupling point between the piezoelectric drive and the transmission element 68.

A further alternative drive can likewise be arranged in the housing portion 69 in an analogous manner to the piezoelectric drive fixed thereto with a closure 63.

The invention claimed is:

1. A measuring device for detecting measurement signals during a penetration movement of a penetration body into a surface of a test body or during a scanning movement of the penetration body on the surface of the test body, having a housing which accommodates a force generator and on which a holding element is arranged spaced apart from the force generator, said holding element being provided to be moveable relative to the housing at least in one direction along a longitudinal axis of the housing and accommodating the penetration body, and having at least one first measuring apparatus for measuring the depth of penetration of the penetration body into the surface of the test body or of a travelling movement of the penetration body along the longitudinal axis towards the housing during a scanning movement on the surface of the test body, and an extending transmission element is provided between the force generator and the penetration body, wherein the holding element is formed on a lower edge region of a housing portion of the housing and at a distance from the force generator, wherein a first sensor element of the first measuring apparatus is fastened in the housing portion of the housing, said sensor element communicating in a non-touching manner with a second sensor element of the first measuring apparatus and being fastened to the transmission element, wherein the transmission element extends between the force generator and the holding element in the housing portion of the housing without guidance, wherein the holding element is formed as a pressure membrane and has a freedom of movement in at least one degree of freedom of the movement direction of the force generator, and wherein the holding element is provided with two parallel longitudinal slots and the holding element is formed to be softer in its extension plane and in a direction parallel to the slots compared to a direction perpendicular thereto.

2. The measuring device according to claim 1, wherein the transmission element is formed to be rod- or pin-shaped.

3. The measuring device according to claim 1, wherein the transmission element is fastened to the force generator by a connection element.

4. The measuring device according to claim 3, wherein the connection element is formed with an accommodating bore and an end of the transmission element is fastened therein.

5. The measuring device according to claim 1, wherein the transmission element is fastened to at least one of the holding element and the penetration body by a connection element.

6. The measuring device according to claim 1, wherein a second measuring apparatus is provided on the transmission element at a distance to the first measuring apparatus, wherein a first sensor of the second measuring apparatus is arranged on the housing or a housing portion of the housing and a second sensor of the second measuring apparatus is arranged on the transmission element.

7. The measuring device according to claim 1, wherein the holding element consists of copper beryllium.

8. The measuring device according to claim 1, wherein the first measuring apparatus or a further measuring device or both operate according to the eddy current principle.

9. The measuring device according to claim 1, wherein the penetration body is arranged exchangeably on a transmission pin or a penetration tip is arranged exchangeably on the penetration body.

10. The measuring device according to claim 1, wherein the force generator is formed as a piezoelectric drive, a pneumatic drive, a hydraulic drive or an electromagnetic drive.

11. The measuring device according to claim 1, wherein
the pressure membrane encompasses the longitudinal axis,
a periphery of the pressure membrane is seated in an edge region of the housing portion of the housing, and
a portion of the transmission element extends through the pressure membrane to couple with the penetrating body.

* * * * *